Patented Aug. 10, 1954

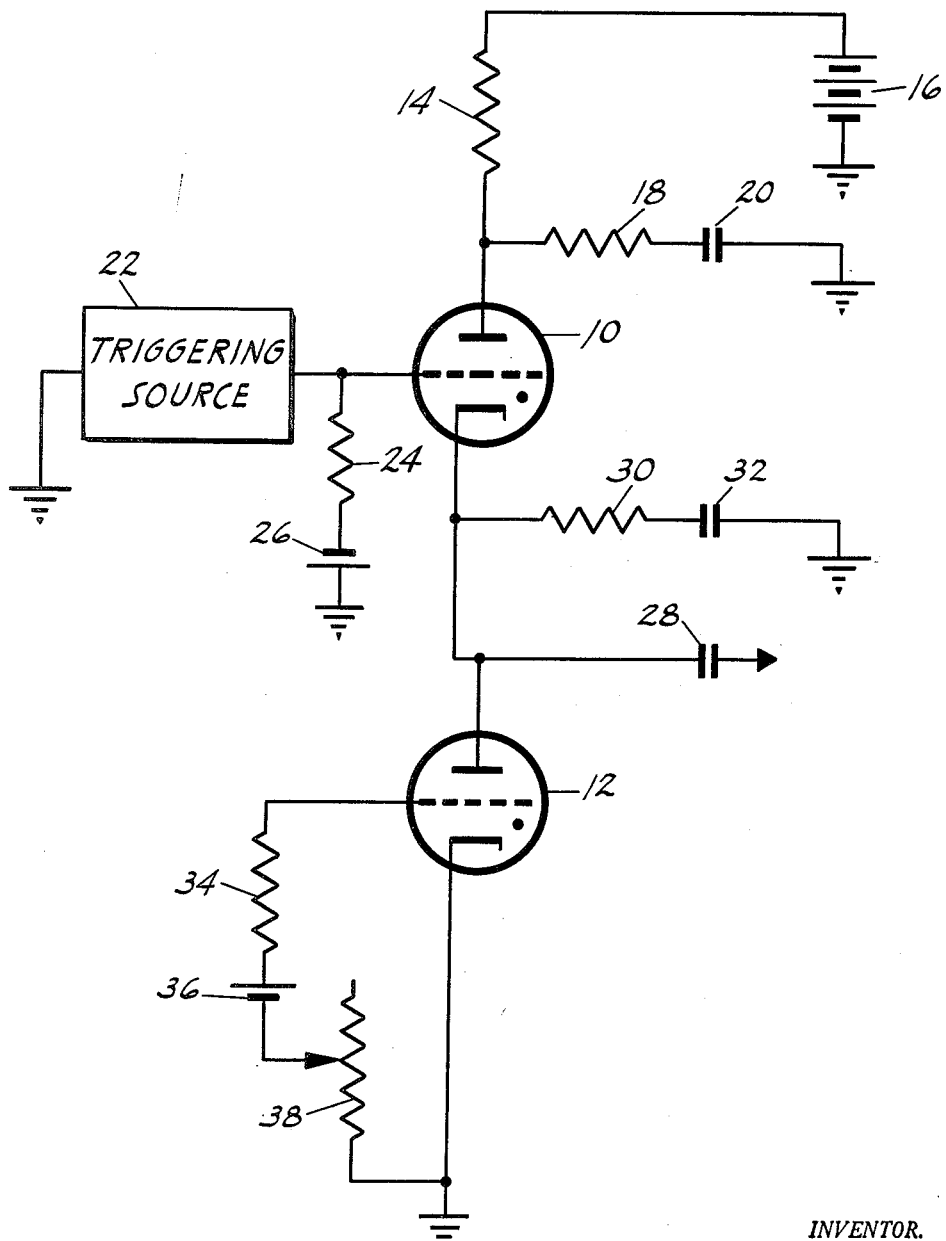

2,686,262

UNITED STATES PATENT OFFICE 2,686,262

PULSE GENERATOR

William C. Wiley, Detroit, Mich., assignor to Bendix Aviation Corporation, Detroit, Mich., a corporation of Delaware Application June 11, 1951, Serial No. 230,905

2 Claims. (Cl. 315—166)

1

This invention relates to a pulse forming circuit and more particularly to a circuit for producing a pulse of relatively short duration.

In many radar and other applications which have been developed during the past few years, pulses of energy having a relatively short duration and relatively large power are required. Such pulses are often used to obtain measurements involving the difference in time between the transmission of a pulse from a particular position and the reception of the pulse back at the position after it has been reflected from a distant target. Since a difference in time is involved, it is often desirable to make the pulses as narrow as possible, even as narrow as 0.5 microsecond or less, especially where extreme accuracy is a critical factor.

Circuits have been developed which are able to produce pulses having a length of a few microseconds, but until now no entirely satisfactory circuit has been developed to produce a stable pulse which is a small fraction of a microsecond long. This invention provides a circuit for producing stable pulses having a duration of as little as 0.1 microsecond or less. This circuit operates in a positive and reliable manner to produce such stable pulses upon the introduction to the circuit of external triggering signals having a somewhat variable duration.

An object of this invention is to provide a circuit for producing pulses of relatively short duration, such as a fraction of a microsecond.

Another object of this invention is to provide a circuit of the above character for producing pulses having a duration of as little as 0.1 microsecond or less.

A further object is to provide a circuit of the above character for producing pulses having an adjustable duration.

Still another object is to provide a circuit of the above character for producing sharp and stable pulses having a duration of a fraction of a microsecond upon the introduction of triggering signals having a somewhat variable duration.

Other objects and advantages will be apparent from a detailed description of the invention and from the appended drawings and claims.

The single figure is a circuit diagram of one embodiment of the invention.

Referring to the embodiment of the invention shown in the figure, a pair of gas-filled tubes 10 and 12 are provided. The plate of the tube 10 is connected through a resistance 14 to the positive terminal of a suitable voltage supply, such as a battery 16, the negative terminal of which is

2 grounded. The plate of the tube 10 is also connected to one terminal of a resistance 18 having its other terminal connected to a grounded capacitance 20. Connections are made from the grid of the tube 10 to a grounded triggering source 22 and to a resistance 24 which is in series with a suitable bias voltage supply, such as a battery 26 having its positive terminal grounded.

The plate of the tube 12 is connected to the cathode of the tube 10, to a capacitance 28 serving as an output coupling capacitance and to a resistance 30 in series with a grounded capacitance 32. A connection is made from the grid of the tube 12 to one side of a resistance 34, the other side of which is connected to the positive terminal of a suitable power supply, such as a battery 36. The negative terminal of the battery 36 is connected to the movable contact of a potentiometer 38 having one of its stationary terminals connected to the grounded cathode of the tube 12.

Between pulses, the tubes 10 and 12 are not conducting. During the time that the tubes are not conducting, the capacitance 20 is charged to a voltage substantially equal to that on the battery 16 through a circuit which includes the battery, the resistances 14 and 18 and the capacitance. Upon the introduction of a positive triggering signal from the source 22, the tube 10 starts to conduct. The conduction of the tube 10 provides a discharge path for the capacitance 20 through a circuit which includes the capacitance 20, the resistance 18, the tube 10, the resistance 30 and the capacitance 32. This discharge occurs relatively rapidly because of the low impedance presented by the resistances 18 and 30 and the tube 10. Because of the discharge, the capacitance 32 is charged to a voltage determined by the relative magnitude of the capacitances 20 and 32 and the energy losses in resistances 18 and 30 and tube 10.

When the voltage across the capacitance 32 has reached substantially its maximum value for a predetermined length of time, the tube 12 starts to conduct. The time required for the capacitance 32 to maintain substantially its maximum charge before the tube 12 starts to conduct is determined by the voltage on the grid of the tube. With increases in the voltage on the grid of the tube 12, the delay between the maximum charging of the capacitance 32 and the conduction of the tube 12 decreases. If the voltage becomes sufficiently positive, the tube 12 may start to conduct even before the capacitance 32 has reached its maximum charge. The voltage on the grid of the tube is controlled by adjusting the position of the movable arm on the potentiometer 38.

When the tube 12 starts to conduct, the capacitances 32 and 20 discharge through the tube in a short and heavy pulse. Thus, a positive voltage appears across the capacitance 32 for only a relatively short period of time so as to form a sharply defined pulse. This pulse is introduced through the capacitance 28 to output circuits (not shown) for subsequent utilization.

The circuit disclosed above has several important advantages. By connecting the capacitance 32 between the two normally non-conductive thyratron tubes 10 and 12, the capacitance is normally prevented from receiving any charge. A flow of current through the thyratron tube 10 substantially defines the leading edge of the pulse produced across the capacitance 32, and a flow of current through the thyratron tube 12 defines the trailing edge. Since a thyratron tube generally responds quickly to produce a full flow of current after current once starts to flow through the tube, a pulse having relatively sharp leading and trailing edges is produced across the capacitance 32. Furthermore, since the thyratrons conduct for only a relatively short time, the pulse is produced across the capacitance 32 with a minimum expenditure of power.

The positive pulse produced across the capacitance 32 is shortened by the positive voltage on the grid of the tube 12. This voltage causes some of the electrons emitted from the cathode of the tube to flow to the grid even during the time that no current is flowing to the plate. This provides a momentum for the electrons and causes the electrons to strike molecules of gas in the tube with sufficient force to produce electrons and positive ions from some of the gas molecules. When a positive voltage is applied on the plate of the tube 12, the electrons flow towards the plate and the positive ions move towards the cathode.

During their movement, the positive ions strike other molecules of gas and produce further electrons which travel to the plate. In this way, a full flow of ions to the plate of the tube 12 is almost instantaneously produced after the voltage on the plate has reached a sufficiently high value. Since the production of a plate current through the tube 12 determines the length of the positive pulse produced across the capacitance 32, the almost instantaneous production of a full current through the tube 12 after current initially starts to flow through the tube causes the length of the pulses to be shortened and the trailing edge of the pulse to be stabilized. By providing a positive voltage on the grid of the tube 12, stable pulses having a duration of as little as 0.1 microsecond or less can be produced across the capacitance 32.

The positive pulse produced across the capacitance 32 has a pulse length which is relatively independent of the length of the triggering pulse from the source 22. This results from the fact that the currents through the tubes 10 and 12 are produced independently of the triggering pulse after the triggering pulse has once been introduced. Furthermore, the circuit disclosed above cannot act to produce a second pulse until the capacitance 20 has been charged to substantially its maximum value, even though the triggering pulse from the source 22 continues during part of the time that the capacitance 20 is being charged. As a result, the circuit disclosed above may produce a pulse having a duration of as little as 0.1 microsecond although it is triggered by a pulse having a duration of several microseconds.

Although this invention has been disclosed and illustrated with reference to particular applications, the principles involved are susceptible of numerous other applications which will be apparent to persons skilled in the art. This invention is, therefore, to be limited only as indicated by the scope of the appended claims.

I claim:

1. Apparatus for producing pulses of relatively short duration, including, a first capacitance, means for normally providing a predetermined charge across the capacitance, a first normally non-conductive gas-filled tube having a plate, a grid and a cathode, the plate of the tube being connected to the capacitance, means for introducing a triggering pulse to the grid of the tube to make the tube conductive for the discharge of the capacitance, a second capacitance connected to the cathode of the tube to receive the discharge current flowing through the tube and to become charged to a predetermined value, a second normally non-conductive gas-filled tube having a plate, a grid and a cathode, the plate being connected to the cathode of the first tube and to the second capacitance, and means including a resistance and a supply of positive potential connected between the grid and the cathode of the second tube for providing a positive bias on the grid of the second tube to control the time between the charging of the second capacitance to the predetermined value and the conduction of the second tube for discharging the capacitance and to provide for the discharge of the second capacitance through the second tube in a period of time less than one half of a microsecond.

2. Apparatus in accordance with claim 1 in which the resistance connected to the grid of the second tube is variable to provide a variable positive bias on the grid.

References Cited in the file of this patent

UNITED STATES PATENTS

| Number | Name | Date |
|---|---|---|
| 2,078,792 | Fitzgerald | Apr. 27, 1937 |
| 2,102,371 | Miller | Dec. 14, 1937 |
| 2,359,747 | Carleton | Oct. 10, 1944 |
| 2,446,802 | Bell | Aug. 10, 1948 |
| 2,496,543 | Kanner | Feb. 7, 1950 |
| 2,567,239 | Sherertz | Sept. 11, 1951 |